US012728907B2

(12) United States Patent
Seki et al.

(10) Patent No.: US 12,728,907 B2
(45) Date of Patent: Sep. 8, 2026

(54) STEEERING DEVICE

(71) Applicant: NSK STEERING & CONTROL, INC., Tokyo (JP)

(72) Inventors: Kodai Seki, Gunma (JP); Yasuyuki Matsuda, Gunma (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 31 days.

(21) Appl. No.: 18/857,061

(22) PCT Filed: Dec. 15, 2022

(86) PCT No.: PCT/JP2022/046204

§ 371 (c)(1),
(2) Date: Oct. 15, 2024

(87) PCT Pub. No.: WO2023/228447

PCT Pub. Date: Nov. 30, 2023

(65) Prior Publication Data

US 2025/0256759 A1 Aug. 14, 2025

(30) Foreign Application Priority Data

May 23, 2022 (JP) ................................ 2022-083948

(51) Int. Cl.
*B62D 1/185* (2006.01)
*B62D 1/181* (2006.01)

(52) U.S. Cl.
CPC ............ *B62D 1/185* (2013.01); *B62D 1/181* (2013.01)

(58) Field of Classification Search
CPC ......... B62D 1/181; B62D 1/183; B62D 1/185
See application file for complete search history.

(56) References Cited

U.S. PATENT DOCUMENTS 5,036,720 A * 8/1991 Shirasawa .............. B62D 1/181 74/89.42
7,025,380 B2 * 4/2006 Arihara .................. B62D 1/181 280/775
7,293,481 B2 * 11/2007 Li .......................... B62D 1/181 74/492

(Continued)

FOREIGN PATENT DOCUMENTS

JP 2007-045235 A 2/2007
JP 2008024243 A * 2/2008

(Continued)

OTHER PUBLICATIONS

International Search Report of PCT/JP2022/046204 dated Jan. 31, 2023 [PCT/ISA/210].

*Primary Examiner* — Laura Freedman
(74) *Attorney, Agent, or Firm* — Sughrue Mion, PLLC

(57) ABSTRACT

A steering device includes a first steering column arranged outside a steering shaft, and a second steering column arranged outside the first steering column and movable relative to the first steering column in a first direction. The first steering column includes a pin extending in a second direction intersecting the first direction. The second steering column includes a projection arranged on one side in the first direction of the pin and capable of abutting on the pin to prevent movement of the first steering column.

7 Claims, 7 Drawing Sheets

(56) References Cited

U.S. PATENT DOCUMENTS

| | | | | |
|---|---|---|---|---|
| 8,161,839 | B2 * | 4/2012 | Warashina | B62D 1/181<br>74/493 |
| 8,650,982 | B2 * | 2/2014 | Matsuno | B62D 1/181<br>74/492 |
| 8,650,983 | B2 * | 2/2014 | Mizuno | B62D 1/181<br>74/496 |
| 9,487,228 | B2 * | 11/2016 | Fevre | B62D 1/181 |
| 10,093,343 | B2 * | 10/2018 | Takahashi | B62D 1/184 |
| 10,189,496 | B2 * | 1/2019 | King | B62D 1/184 |
| 10,882,548 | B2 | 1/2021 | Freudenstein et al. | |
| 11,753,063 | B2 * | 9/2023 | Ku | B62D 1/187<br>74/493 |
| 12,139,188 | B2 * | 11/2024 | Kreutz | B62D 1/192 |
| 12,195,075 | B2 * | 1/2025 | Kim | B62D 1/185 |
| 12,365,382 | B1 * | 7/2025 | Maeda | B62D 1/185 |
| 2008/0079253 | A1 * | 4/2008 | Sekii | B62D 1/195<br>280/775 |
| 2008/0216597 | A1 * | 9/2008 | Iwakawa | B62D 1/181<br>74/493 |
| 2018/0251147 | A1 | 9/2018 | Heitz et al. | |
| 2019/0283793 | A1 * | 9/2019 | Matsuno | B62D 1/195 |
| 2021/0237791 | A1 | 8/2021 | Geiselberger et al. | |
| 2021/0387663 | A1 | 12/2021 | Kojiya et al. | |

FOREIGN PATENT DOCUMENTS

| | | | | |
|---|---|---|---|---|
| JP | 2008056132 | A | * | 3/2008 |
| JP | 2008-080940 | A | | 4/2008 |
| JP | 2008087531 | A | * | 4/2008 |
| JP | 2008094200 | A | * | 4/2008 |
| WO | 2020/085411 | A1 | | 4/2020 |

* cited by examiner

AX1
105
1
2
3
68(67)
51
64
66
108
4
110
113
(112)
107
106
111
100
102
104
X
X2
Y1
Y
Z1
Z2
Y2
X1
Z 100
1
2
3
4
5(50)
35
37
36a(36)
42
51
52
53
521
412
60
61
63(62)
64
66
68(67)
70(7)
71
101
102
104
105
106
108
110
111
114
AX1
AX2
AX3
X
X1
X2
Y
Y1
Y2
Z
Z1
Z2

AX1
105
1
2
5(50)
51
521
522
52
53
63(62)
61
60
3
32
34
33
64
68(67)
66
37
31
35
351
36
42
411
43
41
4
412
73
71
72
70(7)
74
X1
X2
Y1
Y2
Z1
Z2

36a(36)
37
35
101
102
4
42
412
521
106
52
5(50)
51
104
108
64
66
68(67)
71
70(7)
110
63(62)
61
60
111
53
3
AX3
AX2
100
2
1
105
AX1
X
X1
Y1
Z1
Z2
Y2
X2
Z
Y

X1
Y1
Z1
Z2
Y2
X2
81A
35
82A
5(50)
521
52
8A
51
60
63(62)
106
113
(112)
41A
64
4A
68
(67)
72A
53
7A
104
71A
108
3
2
100A
1
105
AX1

8A
X1
X2
Z1
Z2
52
51
5(50)
113
(112)
64
68(67)
4A
53
108
VII
VII
3
7A
2
100A
1
105

STEERING DEVICE

CROSS REFERENCE TO RELATED APPLICATIONS

This application is a National Stage of International Application No. PCT/JP2022/046204 filed on Dec. 15, 2022, claiming priority based on Japanese Patent Application No. 2022-083948 filed on May 23, 2022.

FIELD

The present disclosure relates to a steering device.

BACKGROUND

A retractable steering device disclosed in Patent Literature 1 is known. In the retractable steering device, an extendable steering column is contracted in an axial direction to store a steering wheel in, for example, a dashboard. The steering column extends and contracts in the axial direction by connecting a plurality of steering columns. The retractable steering device includes, for example, a first steering column provided outside a steering shaft to which a steering wheel is connected, a second steering column provided outside the first steering column, and an actuator device that changes an axial distance between the first steering column and the second steering column.

The actuator device includes a ball screw having a screw shaft and a nut, and a motor. One side in the axial direction of the screw shaft is provided on the first steering column, and the nut is engaged with the other side in the axial direction of the screw shaft, so that the nut is provided on the second steering column. When the motor is operated and rotated, the screw shaft rotates, and the nut moves in the axial direction relative to the screw shaft. As a result, the second steering column moves in the axial direction with respect to the first steering column.

Here, when the axial position of the second steering column comes to a predetermined position with respect to the first steering column, the motor stops and the movement of the second steering column stops. However, for example, when the motor fails and the second steering column does not stop at the predetermined position, the second steering column may fall off the first steering column.

In order to prevent this falling off, in Patent Literature 1, a protrusion having a diameter larger than that of a male threaded portion of the threaded shaft and capable of abutting on the nut is provided at the tip of the threaded shaft. When the nut abuts on the protrusion, the rotation of the nut is stopped, and the nut is prevented from coming off from the tip of the screw shaft. This prevents the second steering column from falling off the first steering column.

CITATION LIST

Patent Literature

Patent Literature 1: U.S. Pat. No. 10,882,548

SUMMARY

Technical Problem

In Patent Literature 1, since a protrusion for restricting the movement of the nut is provided at the tip of the screw shaft, the overall length of the screw shaft becomes long. In order to shorten the length of the screw shaft, it is necessary to shorten (thin) the axial length of the protrusion. However, in a case where the protrusion is thinned, when the nut and the protrusion abut on each other, the protrusion is deformed, the movement of the nut cannot be restricted, and the steering column may fall off. That is, there is a demand for a steering device that can more reliably prevent the steering column from falling off without increasing the overall length of the screw shaft.

The present disclosure has been made in view of the above problem, and an object of the present disclosure is to provide a steering device that can more reliably prevent a steering column from falling off without increasing the overall length of a screw shaft.

Solution to Problem

To achieve the above object, a steering device according to an aspect of the present disclosure comprising: a steering shaft extending in a first direction and having a steering wheel coupled to an end portion on one side in the first direction; a first steering column arranged outside the steering shaft; and a second steering column arranged outside the first steering column and is movable relative to the first steering column in the first direction via a first actuator device, wherein the first steering column includes a pin extending in a second direction intersecting the first direction, and the second steering column includes a projection arranged on one side in the first direction of the pin and capable of abutting on the pin.

As described above, in Patent Literature 1, since the protrusion for restricting the movement of the nut is provided at the tip of the screw shaft, the overall length of the screw shaft becomes long. Therefore, there is a demand for a steering device that can more reliably prevent a steering column from falling off without increasing the overall length of a screw shaft.

Against this background, in the present disclosure, a pin provided in a first steering column and extending in a second direction is provided. The pin abuts on a projection of a second steering column, and it is possible to prevent the second steering column from falling off from the first steering column. As described above, according to the present disclosure, it is possible to provide the steering device that can more reliably prevent the steering column from falling off without increasing the overall length of the screw shaft.

In another aspect of the present disclosure, since the projection protrudes in a third direction intersecting a first direction and the second direction, the pin easily abuts on the projection, and the steering column can be more reliably prevented from falling off.

In another aspect of the present disclosure, the projection is provided with a cutout portion on the other side in the first direction, and the pin can abut on the cutout portion. In this manner, since the pin abuts on the cutout portion, the position of the pin is less likely to deviate from the cutout portion, and the second steering column can be more reliably prevented from falling off from the first steering column.

In another aspect of the present disclosure, the projection is a plate-shaped member having a rectangular shape when viewed from the second direction, and the cutout portion is provided at a corner between a side on the other side in the first direction and a side on one side in the third direction in the plate-shaped member. In other words, since the projection is a plate-like member extending in the first direction, the rigidity of the projection regarding force toward the first direction becomes larger, and it is possible to more reliably prevent the second steering column from falling off from the first steering column.

In another aspect of the present disclosure, a third steering column extending along the first direction is provided between the steering shaft and the first steering column; the third steering column is movable relative to the first steering column in the first direction via a second actuator device; and the second actuator device is attached to the first steering column via the pin. In other words, since the pin is attached to the second actuator device and the first steering column, the attachment rigidity of the pin is further improved. Therefore, the pin is less likely to be damaged, and the second steering column can be more reliably prevented from falling off from the first steering column.

In another aspect of the present disclosure, a through hole penetrating in a second direction is provided in an attachment portion of the second actuator device to the first steering column; the first steering column has a flange protruding to one side in a third direction, the flange being provided with a through hole penetrating in the second direction; and the pin penetrates the through hole of the attachment portion and the through hole of the flange, and the second actuator device is attached to the first steering column. Therefore, since the attachment rigidity of the pin is further improved, the pin is even less likely to be damaged, and the second steering column can be more reliably prevented from falling off from the first steering column.

A steering device according to an aspect of the present disclosure comprising: a steering shaft extending in a first direction and having a steering wheel coupled to an end portion on one side in the first direction; a first steering column arranged outside the steering shaft; a second steering column arranged outside the first steering column and is movable relative to the first steering column in the first direction; and a third steering column arranged between the steering shaft and the first steering column and extending along the first direction, wherein the third steering column is movable relative to the first steering column in the first direction via an actuator device including a motor and a gear box, and the second steering column includes a frame portion that is arranged on one side in the first direction of the motor and the gear box and is capable of abutting on the motor or the gear box.

Therefore, the frame portion can abut on the motor or the gear box of the first actuator device. The frame portion and the motor or the gear box can easily have higher rigidity than the above-described pin and plate-like member. Therefore, damage to the frame portion and the motor or the gear box is further reduced, and the second steering column can be more reliably prevented from falling off from the first steering column. Note that this also makes it possible to provide a steering device that can more reliably prevent a steering column from falling off without increasing the overall length of a screw shaft.

Advantageous Effects of Invention

According to the steering device of the present disclosure, it is possible to provide the steering device that can more reliably prevent the steering column from falling off without increasing the overall length of the screw shaft.

DESCRIPTION OF EMBODIMENTS

Figure 1:
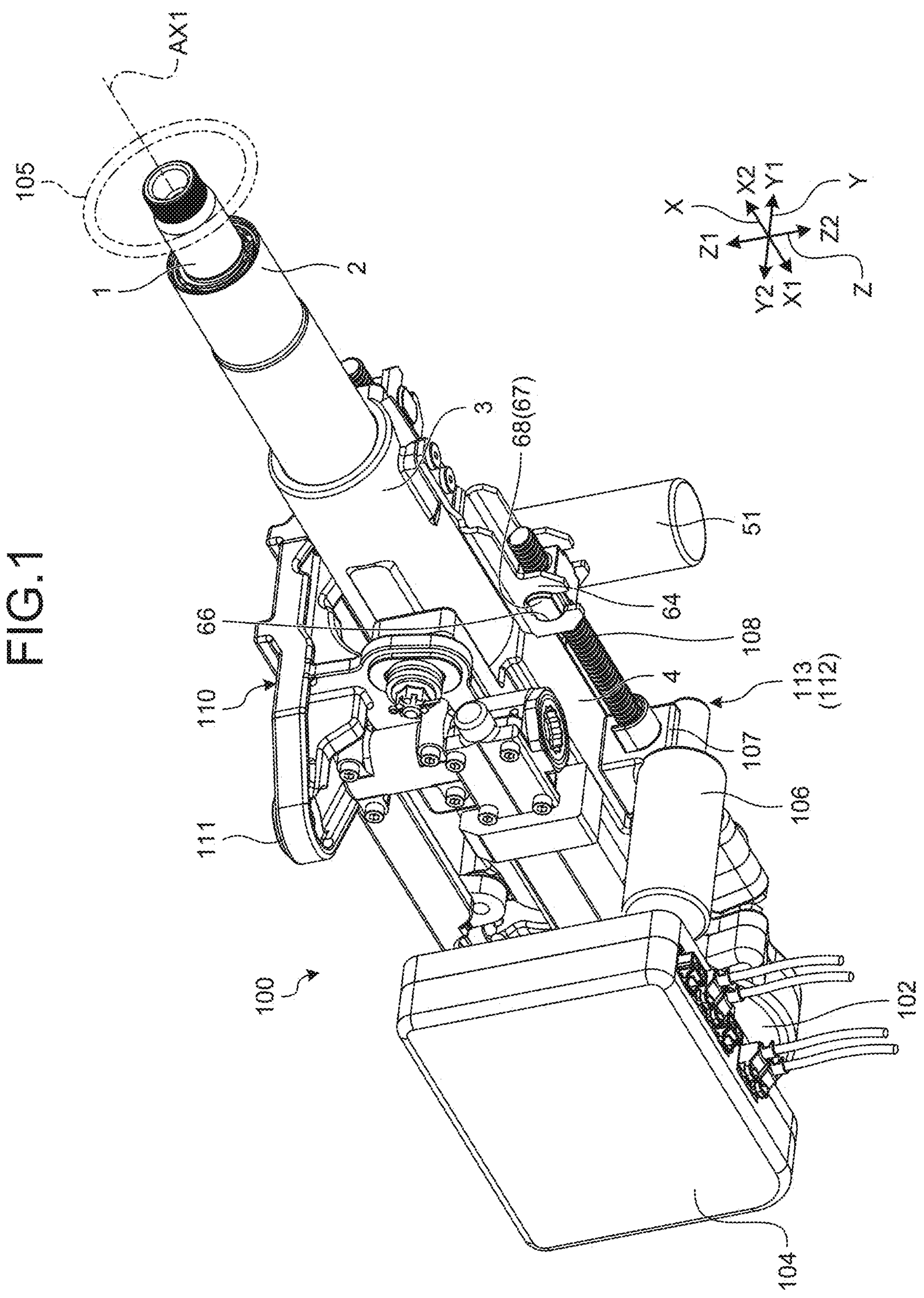
FIG. 1 is a perspective view of a steering device of a first embodiment.

Hereinafter, the present invention will be described in detail with reference to the drawings. Note that the present invention is not limited by the following modes for carrying out the invention (hereinafter referred to as embodiments). In addition, constituent elements in the following embodiments include those that can be easily assumed by those skilled in the art, those that are substantially the same, and those within a so-called equivalent range. Furthermore, the constituent elements disclosed in the following embodiments can be appropriately combined. In addition, constituent elements having the same configuration are denoted by the same reference numerals, and the description thereof will be omitted. Note that in the XYZ orthogonal coordinates, the Y direction is orthogonal to (intersects) the X direction. The Z direction is orthogonal to (intersects) the X direction and the Y direction. The X1 side is opposite to the X2 side, the Y1 side is opposite to the Y2 side, and the 21 side is opposite to the Z2 side. In the following description, the X direction corresponds to a first direction, the Z direction corresponds to a second direction, and the Y direction corresponds to a third direction. The X2 side is one side in the first direction, the X1 side is the other side in the first direction, the Z1 side is one side in the second direction, the Z2 side is the other side in the second direction, the Y1 side is one side in the third direction, and the Y2 side is the other side in the third direction.

First Embodiment

Figure 2:
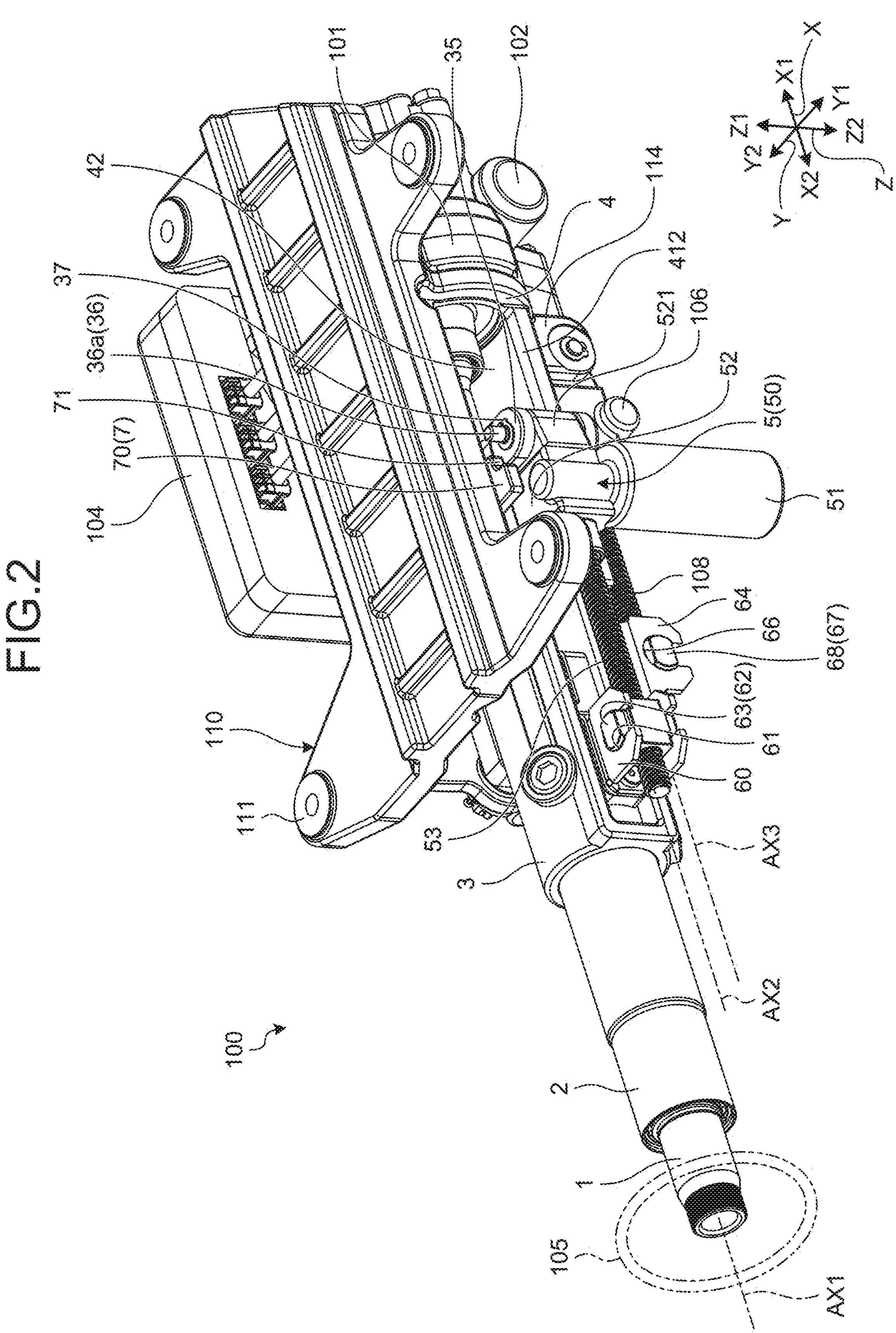
FIG. 2 is a perspective view of the steering device of the first embodiment, illustrating a state in which a pin and a projection are separated from each other.
Figure 3:
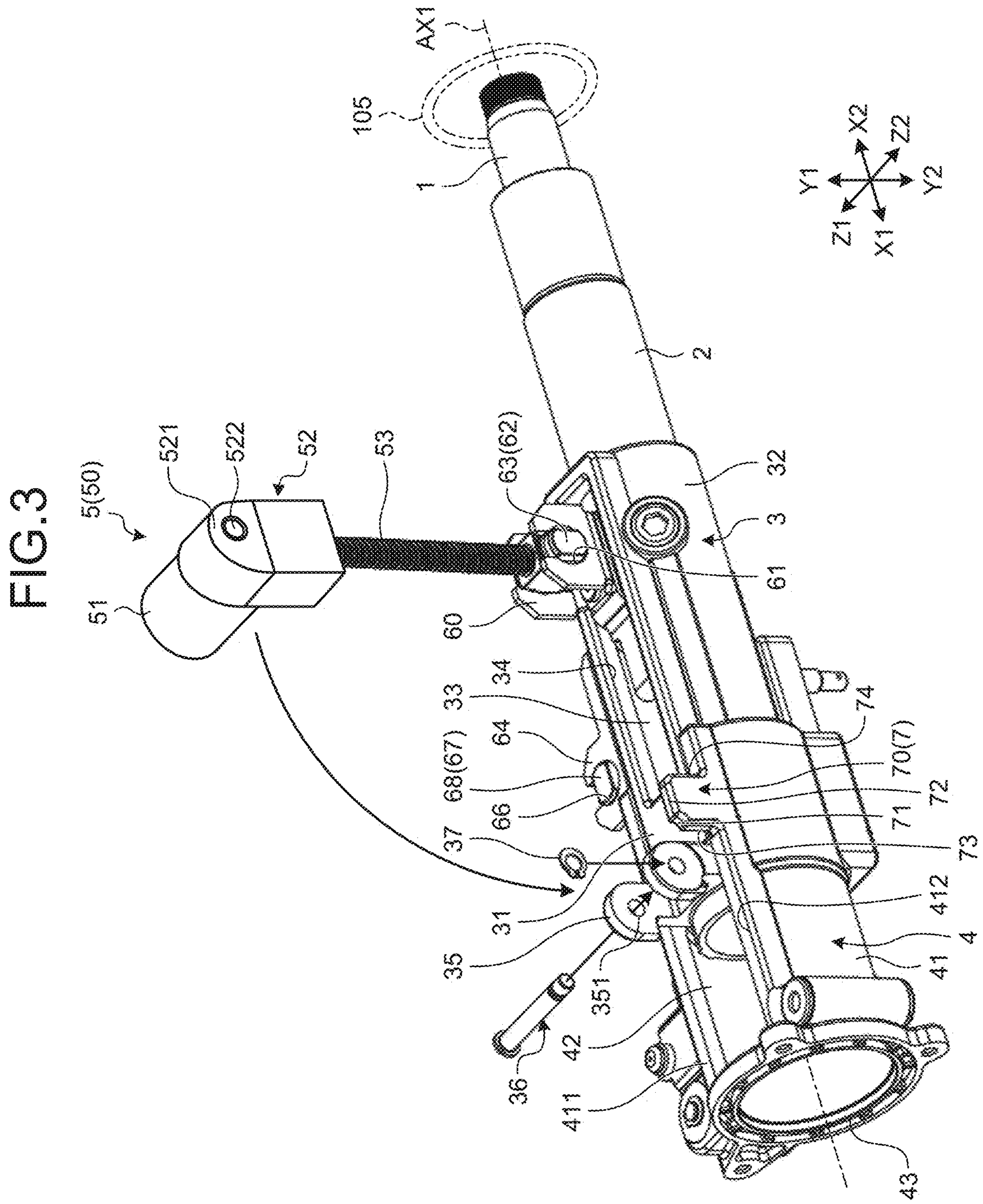
FIG. 3 is a perspective view of the steering device of the first embodiment, illustrating a state in which a second actuator device is assembled.

FIG. 1 is a perspective view of a steering device of a first embodiment. FIG. 2 is a perspective view of the steering device of the first embodiment, illustrating a state in which a pin and a projection are separated from each other. FIG. 3 is a perspective view of the steering device according to the first embodiment, illustrating a state in which a second actuator device is assembled.

In the first embodiment, a steering device 100 is, for example, a retractable steering device. In the retractable steering device, when the vehicle is not driven, an extendable steering column can be contracted in the axial direction to store a steering wheel in, for example, a dashboard. Moreover, when the vehicle is driven, the steering column can be extended in the axial direction, and the steering wheel can protrude from the inside of the dashboard into the vehicle interior, for example. Details will be described below.

As illustrated in FIGS. 1 to 3, the steering device 100 includes a steering shaft 1, an inner column 2 (third steering column), an intermediate column 3 (first steering column), an outer column 4 (second steering column), a first actuator unit 113, and a second actuator unit 5.

As illustrated in FIGS. 1 to 3, a steering wheel 105 is coupled to an end portion of the steering shaft 1 on the X2 side. The end portion on the X2 side is also referred to as a rear end portion or an end portion on one side in the first direction. Then, when the driver operates the steering wheel 105, the steering shaft 1 rotates about a first central axis AX1, and an operation torque is applied to the steering shaft 1. In this manner, the steering shaft 1 is coupled to the steering wheel 105 and extends in the X direction (first direction, axial direction).

The steering shaft 1 is inserted into the inner periphery of the inner column 2. In other words, the cylindrical inner column 2 is arranged outside the steering shaft 1. The inner column 2 is also referred to as a third steering column. The inner column 2 is connected to the steering shaft 1 via a torsion bar (not illustrated).

The inner column 2 is inserted inside the intermediate column 3. In other words, the cylindrical intermediate column 3 is arranged outside the inner column 2. The intermediate column 3 is also referred to as a first steering column. The inner column 2 and the intermediate column 3 can move relative to each other along the X direction via the second actuator unit 5. The second actuator unit 5 extends in the X direction (first direction) which is the axial direction of a second central axis AX2. The second actuator unit 5 couples the inner column 2 to the intermediate column 3 and changes the axial distance between the inner column 2 and the intermediate column 3.

The cylindrical intermediate column 3 is arranged outside the inner column 2, and an open portion 33 is provided on a side portion thereof. The intermediate column 3 is provided with a flat portion 31 and a curved portion 32. The flat portion 31 is a plane extending in the X direction and the Z direction. The open portion 33 has a rectangular shape when viewed from the Y direction. Specifically, an inner peripheral wall portion 34 facing the open portion 33 has a rectangular shape elongated along the X direction.

A flange 35 protruding toward the Y1 side is provided at an end portion on the X1 side of the flat portion 31. One flange 35 is provided on each of the Z1 side and the Z2 side. The two flanges 35 are provided with through holes 351. A pin 36 is inserted into the through hole 351. The pin 36 extends in the Z direction.

A bracket 60 is fixed to the outer periphery of the inner column 2. The bracket 60 is provided with a cutout portion 61. The cutout portion 61 is open on the Y1 side. The bracket 60 can move inside the open portion 33 along the X direction. When the bracket 60 abuts on an end portion of the inner peripheral wall portion 34 on the X2 side, the movement of the inner column 2 on the X2 side with respect to the intermediate column 3 is prevented, whereby the inner column 2 is prevented from coming off from the intermediate column 3.

Additionally, the second actuator unit 5 includes a second actuator device 50, the bracket 60, and the flange 35. The second actuator device 50 includes a motor 51, a gear box 52, a screw shaft 53, and a nut 62.

In the second actuator device 50, a male screw is formed on the outer periphery of the screw shaft 53. The screw shaft 53 extends in the X direction (first direction) which is the axial direction of the second central axis AX2. A female screw is formed on the inner periphery of the nut 62, and the female screw meshes with the male screw of the screw shaft 53. The nut 62 has a protrusion 63 protruding in the Z direction. The protrusion 63 of the nut 62 is fitted into the cutout portion 61 of the bracket 60. In this manner, the X2 side of the second actuator device 50 is fixed to the inner column 2 via the nut 62 and the bracket 60.

Figure 4:
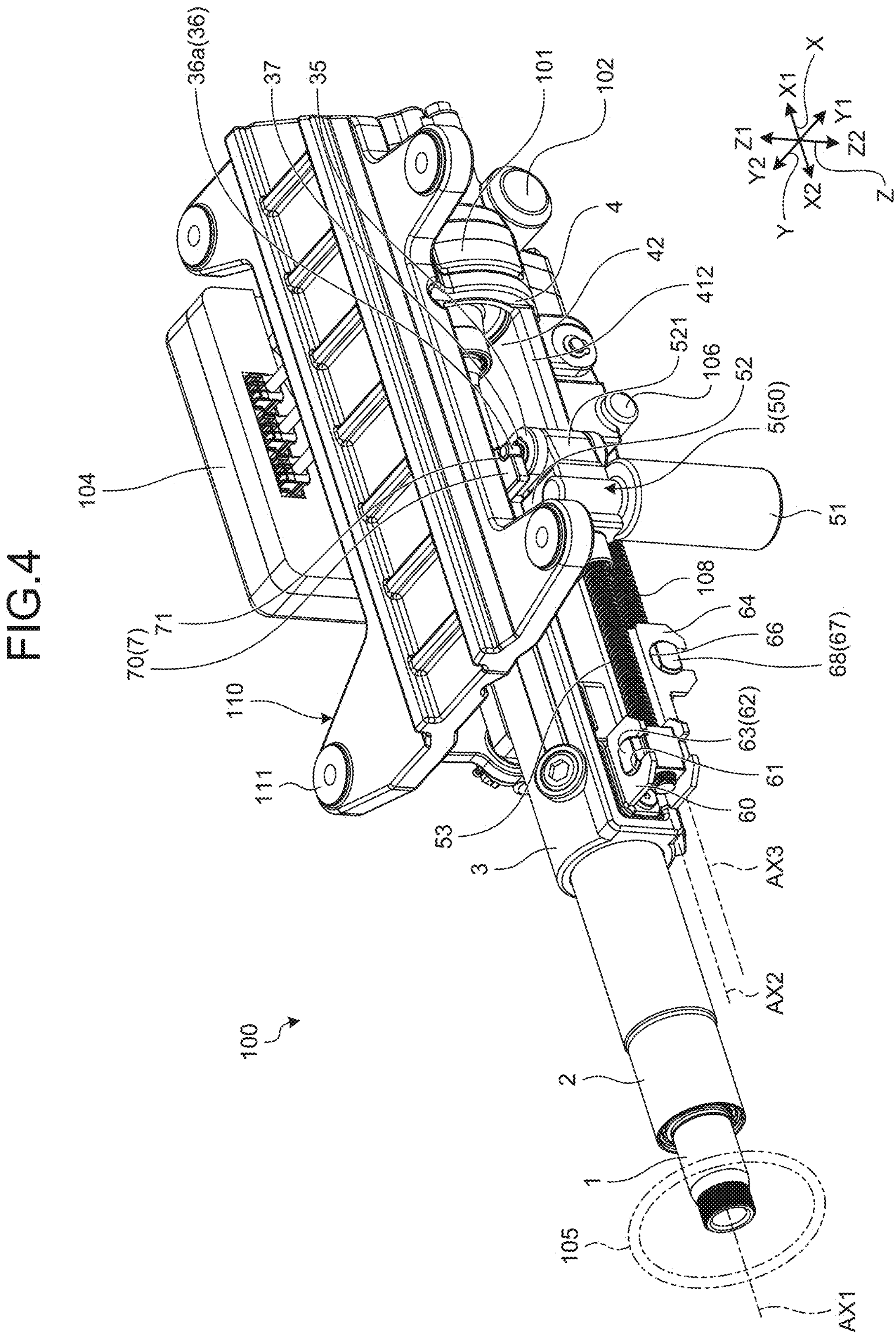
FIG. 4 is a perspective view of the steering device of the first embodiment, illustrating a state in which the pin and the projection are in contact with each other.

The X1 side of the screw shaft 53 is attached to the intermediate column 3 via the gear box 52, the pin 36, and the flange 35. Hereinafter, a specific description will be given. The gear box 52 is attached to the screw shaft 53 on the X1 side. A worm shaft (not illustrated) of the motor 51 and a worm wheel (not illustrated) attached to the screw shaft 53 are housed inside the gear box 52, and the worm shaft and the worm wheel are meshed with each other. That is, the gear box 52 houses a worm gear mechanism in which a worm shaft provided on the output shaft of the motor 51 and a worm wheel provided on the screw shaft 53 mesh with each other. When the motor 51 rotates by the worm gear mechanism, the screw shaft 53 rotates via the worm shaft and the worm wheel. As illustrated in FIGS. 2 and 4, the gear box 52 is attached to the screw shaft 53 on the X1 side. The gear box 52 has a protruding portion 521 (attachment portion). The protruding portion 521 is provided with a through hole 522 penetrating in the Z direction. The pin 36 penetrates the through hole 351 of the flange 35 and the through hole 522 of the protruding portion 521. As described above, the protruding portion 521 of the second actuator device 50 is an attachment portion for attaching the second actuator device 50 to the intermediate column 3. Then, as illustrated in FIG. 2, a tip portion 36*a* of the pin 36 protrudes toward the 21 side from the flange 35. A snap ring 37 is fitted to the tip portion 36*a* of the pin 36. The snap ring 37 has an effect of retaining the pin 36. As a result, the protruding portion 521 (attachment portion) of the second actuator device 50 is attached to the flange 35 via the pin 36.

According to the second actuator unit 5 having the above configuration, the motor 51 is operated and rotated, and the worm wheel also rotates when the worm shaft rotates inside the gear box 52. Then, since the screw shaft 53 rotates together with the worm wheel, the nut 62 meshed with the screw shaft 53 moves in the axial direction (X direction, first direction) with respect to the screw shaft 53. As a result, the relative distance between the nut 62 and the gear box 52 along the X direction changes. Therefore, the inner column 2 can move relative to the intermediate column 3 in the X direction via the second actuator unit 5.

The intermediate column 3 is arranged inside the outer column 4. In other words, the outer column 4 is arranged outside the intermediate column 3. The outer column 4 is also referred to as a second steering column. The outer column 4 includes a main body portion 41 and a projection 7. In the present embodiment, a plate-shaped member 70 is applied as an example of the projection 7.

The side of the main body portion 41 on the Y1 side is open. That is, the main body portion 41 extends in an arc shape along the circumferential direction around the axis of the first central axis AX1 and has a substantially U-shaped cross section. In the main body portion 41, one end portion in the circumferential direction is a first circumferential end portion 411, and the other end portion in the circumferential direction is a second circumferential end portion 412. An opening 42 is formed between the first circumferential end portion 411 and the second circumferential end portion 412. That is, the main body portion 41 has a substantially U-shaped cross section open on the Y1 side. Additionally, an annular member 43 having an annular shape is attached to an end portion of the main body portion 41 on the X1 side. Each of the first circumferential end portion 411 and the second circumferential end portion 412 extends linearly along the X direction. The first circumferential end portion 411 and the second circumferential end portion 412 are substantially parallel. The first circumferential end portion 411 and the second circumferential end portion 412 are separated in the Z direction. The first circumferential end portion 411 is located on the z1 side, and the second circumferential end portion 412 is located on the Z2 side. The plate-shaped member 70 is provided at a portion of the second circumferential end portion 412 on the X2 side. The plate-shaped member 70 protrudes toward the Y1 side. The plate-shaped member 70 has a substantially rectangular shape when viewed from the Z direction, and has an end surface (side) 72 on the Y1 side, an end surface (side) 73 on the X1 side, and an end surface (side) 74 on the X2 side. The end surface (side) 73 and the end surface (side) 74 extend substantially in parallel along the Y direction. An arc-shaped cutout portion 71 is provided at a corner between the end surface (side) 72 and the end surface (side) 73 when viewed from the Z direction. The cutout portion 71 is recessed toward the end surface (side) 74. The pin 36 can abut on the cutout portion 71.

The intermediate column 3 and the outer column 4 can move relative to each other along the X direction via the first actuator unit 113. The first actuator unit 113 extends in the X direction (first direction) which is the axial direction of a third central axis AX3. The first actuator unit 113 includes a first actuator device 112, a bracket 64, and a flange 114. The first actuator device 112 includes a motor 106, a gear box 107, a screw shaft 108, and a nut 67. The gear box 107 is attached to the outer column 4. The gear box 107 houses a worm gear mechanism in which a worm shaft provided on the output shaft of the motor 106 meshes with a worm wheel provided on the screw shaft 108. When the motor 106 is rotated by the worm gear mechanism, the screw shaft 108 rotates via the worm shaft and the worm wheel. The gear box 107 is attached to the screw shaft 108 on the X1 side. The nut 67 is attached to the screw shaft 108 on the X2 side. The nut 67 has a protrusion 68 protruding in the Y direction. The bracket 64 is fixed to the outer periphery of the intermediate column 3. The bracket 64 is provided with a cutout portion 66. The cutout portion 66 is open on the Z2 side. The protrusion 68 of the nut 67 is fitted into the cutout portion 66 of the bracket 64.

According to the first actuator unit 113 having the above configuration, when the motor 106 operates and the worm shaft rotates, the worm wheel also rotates. Then, since the screw shaft 108 rotates together with the worm wheel, the nut 67 meshed with the screw shaft 108 moves in the axial direction (X direction, first direction). As a result, the relative distance between the nut 67 and the gear box 107 along the X direction changes. Therefore, the intermediate column 3 can move relative to the outer column 4 in the X direction via the first actuator unit 113.

Note that the outer column 4 is provided with a gear box 101, an electric motor 102, and an ECU104. A worm shaft and a worm wheel of the electric motor 102 are housed inside the gear box 101, and the worm shaft and the worm wheel mesh with each other. The ECU104 controls the operation of the electric motor 102. An auxiliary torque is applied to the steering shaft 1 by the ECU104 and the electric motor 102. That is, the steering device 100 of the present embodiment is an electric power steering device that assists the driver's steering with the electric motor 102.

Note that an attachment member 110 is provided on the Z1 side of the outer column 4. The attachment member 110 is provided with four attachment portions 111, and the attachment member 110 is attached to the vehicle body via the four attachment portions 111.

Next, the movement of the pin 36 when the intermediate column 3 moves in the X direction with respect to the outer column 4 will be described. FIG. 4 is a perspective view of the steering device according to the first embodiment, illustrating a state in which the pin and the projection are in contact with each other.

As described above, the steering device 100 is a retractable steering device, and axially contracts an extendable steering column to store the steering wheel 105 in, for example, a dashboard. When the steering column is extended and the steering wheel 105 is moved from the dashboard toward the vehicle rear side (X2 side), the first actuator unit 113 and the second actuator unit 5 are operated to move the inner column 2 and the intermediate column 3 toward the X2 side. For example, as described above, the inner column 2 can move relative to the intermediate column 3 in the X direction via the second actuator unit 5. Additionally, the intermediate column 3 can move relative to the outer column 4 in the X direction via the first actuator unit 113.

For example, as illustrated in FIG. 2, when the position of the intermediate column 3 in the X direction with respect to the outer column 4 reaches a predetermined position, the rotation of the motor 51 of the second actuator unit 5 stops. However, when the rotation of the motor 51 does not stop at the predetermined position due to some abnormality or the like, the intermediate column 3 moves further to the X2 side with respect to the outer column 4 from the state of FIG. 2.

In this case, as illustrated in FIG. 4, the pin 36 abuts on the cutout portion 71 of the plate-shaped member 70. As a result, the intermediate column 3 is prevented from moving in the X direction with respect to the outer column 4, and the outer column 4 is prevented from falling off from the intermediate column 3.

As described above, the steering device 100 according to the first embodiment includes the steering shaft 1 extending in the X direction and having the steering wheel 105 coupled to the end portion on the X2 side, the intermediate column 3 (first steering column) arranged outside the steering shaft 1, and the outer column 4 (second steering column) arranged outside the intermediate column 3 (first steering column) and movable relative to the intermediate column 3 (first steering column) in the X direction via the first actuator unit 113. The intermediate column 3 (first steering column) has the pin 36 extending in the Z direction, and the outer column 4 (second steering column) has the projection 7 disposed on the X2 side of the pin 36 and capable of abutting on the pin 36.

As described above, in Patent Literature 1, since the protrusion for restricting the movement of the nut is provided at the tip of the screw shaft, the overall length of the screw shaft becomes long. Therefore, there is a demand for a steering device that can more reliably prevent a steering column from falling off without increasing the overall length of a screw shaft.

On the other hand, in the present embodiment, the pin 36 provided in the intermediate column 3 (first steering column) and extending in the Z direction is provided. The pin 36 abuts on the projection 7 of the outer column 4, and it is possible to prevent the outer column 4 (second steering column) from falling off the intermediate column 3 (first steering column). As described above, according to the first embodiment, it is possible to provide the steering device 100 that can more reliably prevent the outer column 4 (second steering column) from falling off without increasing the overall length of the screw shaft 53.

Additionally, the projection 7 is provided with the cutout portion 71 on the X1 side, and the pin 36 can abut on the cutout portion 71. In this manner, since the pin 36 abuts on the cutout portion 71, the position of the pin 36 is less likely to deviate from the cutout portion 71.

Furthermore, the projection 7 is the plate-shaped member 70 having a rectangular shape when viewed from the Z direction, and the cutout portion 71 is provided at a corner between the end surface (side) 72 on the Y1 side and the end surface (side) 73 on the X1 side in the plate-shaped member 70. In other words, since the projection 7 is a plate-like member extending in the X direction, the rigidity of the projection 7 regarding force in the X direction becomes larger, and the outer column 4 can be more reliably prevented from falling off from the intermediate column 3.

Moreover, the inner column 2 (third steering column) extending along the X direction is provided between the steering shaft 1 and the intermediate column 3 (first steering column), the inner column 2 is movable relative to the intermediate column in the first direction via a second actuator device, and the second actuator device 50 is attached to the intermediate column 3 via the pin 36. In other words, since the pin 36 is attached to the second actuator device 50 and the intermediate column 3, the attachment rigidity of the pin 36 is further improved. Therefore, the pin 36 is less likely to be damaged, and the outer column 4 can be more reliably prevented from falling off from the intermediate column 3.

Note that the intermediate column 3 (first steering column) has the flange 35 protruding toward the Y1 side, and the flange 35 is provided with the through hole 351 penetrating in the Z direction. The protruding portion 521 (attachment portion) of the second actuator device 50 is provided with the through hole 522 penetrating in the Z direction. The pin 36 penetrates the through hole 522 of the protruding portion 521 and the through hole 351 of the flange 35, and the second actuator device 50 is attached to the intermediate column 3.

In this manner, the pin 36 is attached to the flange 35 and the protruding portion 521 (attachment portion) of the second actuator device 50. Therefore, since the attachment rigidity of the pin 36 is improved, the pin 36 is hardly damaged, and the outer column 4 can be more reliably prevented from falling off from the intermediate column 3.

Second Embodiment

Figure 5:
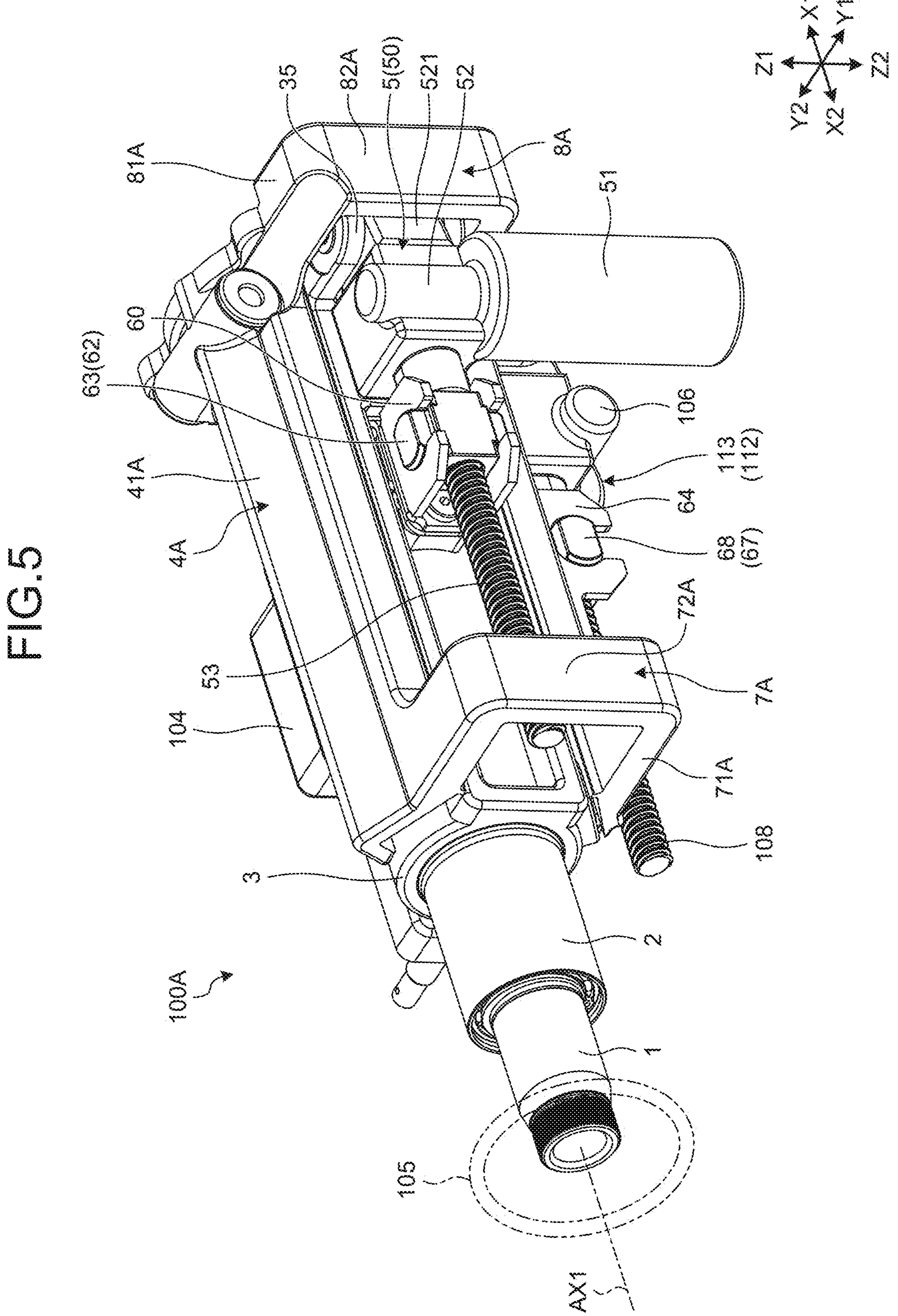
FIG. 5 is a perspective view of a steering device of a second embodiment.
Figure 6:
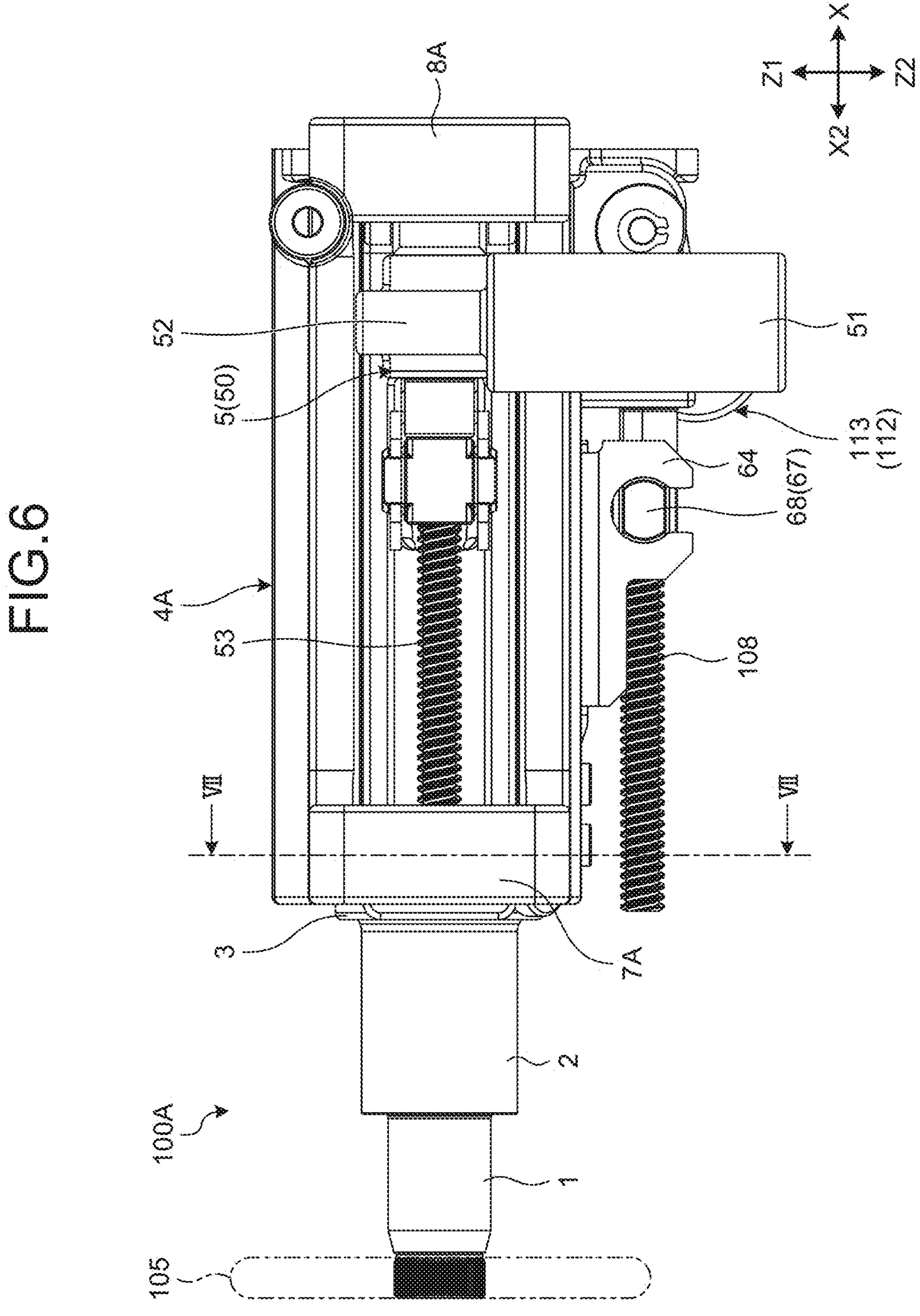
FIG. 6 is a side view of the steering device of the second embodiment.
Figure 7:
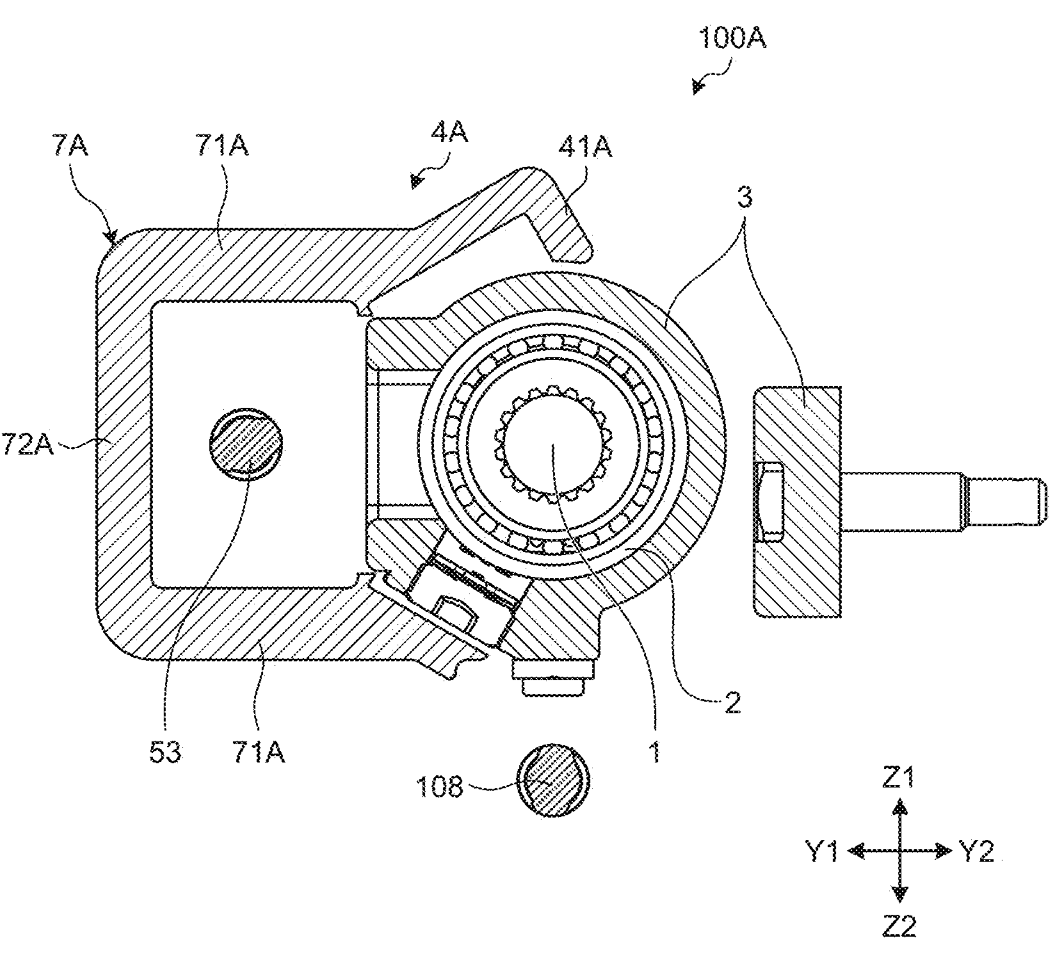
FIG. 7 is a cross-sectional view taken along line VII-VII of FIG. 6.

Next, a second embodiment will be described. FIG. 5 is a perspective view of a steering device of the second embodiment. FIG. 6 is a side view of the steering device of the second embodiment. FIG. 7 is a cross-sectional view taken along line VII-VII of FIG. 6.

In a steering device 100A according to the second embodiment, a first frame (frame portion) 7A and a second frame 8A are provided in an outer column 4A. Hereinafter, a specific description will be given.

As illustrated in FIGS. 5 to 7, the outer column 4A includes a main body portion 41A, a first frame 7A (frame portion), and a second frame 8A.

The main body portion 41A is provided on the Z1 side and the Z2 side. The main body portion 41A extends along the X direction. As illustrated in FIG. 7, the main body portion 41A on the Z1 side has a V-shaped cross section protruding toward the Z1 side.

The first frame 7A has a substantial U shape when viewed from the X direction. Specifically, the first frame 7A includes a pair of legs 71A and a coupling portion 72A. The pair of legs 71A are separated in the Z direction. That is, the leg 71A on the Z1 side and the leg 71A on the Z2 side are coupled via the coupling portion 72A. When viewed from the X direction, the first frame 7A does not overlap a bracket 60 and a nut 62. That is, when an inner column 2 moves in the X direction with respect to an intermediate column 3, the bracket 60 and the nut 62 also move in the X direction. At this time, the bracket 60 and the nut 62 can pass through the inside of the first frame 7A.

The second frame 8A has a substantial U shape when viewed from the X direction. Specifically, the second frame 8A includes a pair of legs 81A and a coupling portion 82A. The pair of legs 81A are separated in the Z direction. The second frame 8A covers the outside of a protruding portion 521 and a flange 35. In other words, the second frame 8A overlaps the protruding portion 521 and the flange 35 when viewed from the Y direction.

Additionally, a second actuator unit 5 includes a second actuator device 50. As described above, the second actuator device 50 includes a motor 51, a gear box 52, a screw shaft 53, and a nut 62. When viewed from the X direction, the first frame 7A overlaps the motor 51 and the gear box 52. Therefore, for example, the motor 51 and the gear box 52 in the second actuator device 50 can abut on the first frame 7A.

As described above, in the steering device 100A according to the second embodiment, the inner column 2 (third steering column) extending along the X direction is provided between a steering shaft 1 and the intermediate column 3 (first steering column), and the inner column 2 (third steering column) is movable relative to the intermediate column 3 (first steering column) in the X direction via the second actuator device 50. The inner column 2 (third steering column) is movable relative to the intermediate column 3 (first steering column) in the X direction via the second actuator unit 5, and the outer column 4 (second steering column) includes the first frame 7A (frame portion) which is disposed on the X2 side of the second actuator unit 5 and can abut on the motor 51 or the gear box 52 of the second actuator device 50.

In the second embodiment, the first frame 7A (frame portion) and the motor 51 or the gear box 52 of the second actuator device 50 can abut on each other. The second embodiment, too, can provide the steering device 100A that can more reliably prevent the outer column 4 (second steering column) from falling off without increasing the overall length of the screw shaft 53. Note that since the first frame 7A (frame portion) and the motor 51 or the gear box 52 have higher rigidity than the pin 36 and the plate-shaped member 70 of the first embodiment, this, too, can more reliably prevent the outer column 4 (second steering column) from falling off.

REFERENCE SIGNS LIST

- 1 STEERING SHAFT
- 2 INNER COLUMN (THIRD STEERING COLUMN)
- 3 INTERMEDIATE COLUMN (FIRST STEERING COLUMN)
- 31 FLAT PORTION
- 32 CURVED PORTION
- 33 OPEN PORTION
- 34 INNER PERIPHERAL WALL PORTION
- 35 FLANGE
- 351 THROUGH HOLE
- 36 PIN
- **36*a*** TIP PORTION
- 37 SNAP RING

4, 4A OUTER COLUMN (SECOND STEERING COLUMN)
41, 41A MAIN BODY PORTION
411 FIRST CIRCUMFERENTIAL END PORTION
412 SECOND CIRCUMFERENTIAL END PORTION
42 OPENING
43 ANNULAR MEMBER
5 SECOND ACTUATOR UNIT
50 SECOND ACTUATOR DEVICE
51 MOTOR
52 GEAR BOX
521 PROTRUDING PORTION (ATTACHMENT PORTION)
522 THROUGH HOLE
53 SCREW SHAFT
60 BRACKET
61 CUTOUT PORTION
62 NUT
63 PROTRUSION
64 BRACKET
66 CUTOUT PORTION
67 NUT
68 PROTRUSION
7 PROJECTION
70 PLATE-SHAPED MEMBER
71 CUTOUT PORTION
72 END SURFACE (SIDE)
73 END SURFACE (SIDE)
74 END SURFACE (SIDE)
7A FIRST FRAME (FRAME PORTION)
71A LEG
72A COUPLING PORTION
8A SECOND FRAME
81A LEG
82A COUPLING PORTION
100, 100A STEERING DEVICE
101 GEAR BOX
102 ELECTRIC MOTOR
104 ECU
105 STEERING WHEEL
106 MOTOR
107 GEAR BOX
108 SCREW SHAFT
110 ATTACHMENT MEMBER
111 ATTACHMENT PORTION
112 FIRST ACTUATOR DEVICE
113 FIRST ACTUATOR UNIT
114 FLANGE
AX1 FIRST CENTRAL AXIS
AX2 SECOND CENTRAL AXIS
AX3 THIRD CENTRAL AXIS

The invention claimed is:

1. A steering device comprising:

a steering shaft extending in a first direction and having a steering wheel coupled to an end portion on one side in the first direction;

a first steering column arranged outside the steering shaft; and a second steering column arranged outside the first steering column and is movable relative to the first steering column in the first direction via a first actuator device, wherein the first steering column includes a pin extending in a second direction intersecting the first direction, the second steering column includes a projection arranged on one side in the first direction of the pin and capable of abutting on the pin, the first steering column has a first flange and a second flange that protrude toward a third direction intersecting the first direction and the second direction and that are apart in the second direction, each of the first flange and the second flange has a through hole penetrating in the second direction, the pin penetrates a pair of the through holes, a part of the pin protrudes from one side of the first flange and the second flange toward the second direction, and the part is capable of abutting on the projection.

2. A steering device comprising:

a steering shaft extending in a first direction and having a steering wheel coupled to an end portion on one side in the first direction;

a first steering column arranged outside the steering shaft; and a second steering column arranged outside the first steering column and is movable relative to the first steering column in the first direction via a first actuator device, wherein the first steering column includes a pin extending in a second direction intersecting the first direction, the second steering column includes a projection arranged on one side in the first direction of the pin and capable of abutting on the pin, and the projection protrudes in a third direction intersecting the first direction and the second direction.

3. The steering device according to claim 2, wherein the projection is provided with a cutout portion on an other side in the first direction, and the pin is capable of abutting on the cutout portion.

4. The steering device according to claim 3, wherein the projection is a plate-shaped member having a rectangular shape when viewed from the second direction, and the cutout portion is provided at a corner between a side on the other side in the first direction and a side on one side in the third direction in the plate-shaped member.

5. A steering device comprising:

a steering shaft extending in a first direction and having a steering wheel coupled to an end portion on one side in the first direction;

a first steering column arranged outside the steering shaft; and a second steering column arranged outside the first steering column and is movable relative to the first steering column in the first direction via a first actuator device, wherein the first steering column includes a pin extending in a second direction intersecting the first direction, the second steering column includes a projection arranged on one side in the first direction of the pin and capable of abutting on the pin, a third steering column extending along the first direction is provided between the steering shaft and the first steering column;

the third steering column is movable relative to the first steering column in the first direction via a second actuator device; and the second actuator device is attached to the first steering column via the pin.

6. The steering device according to claim 5, wherein:

a through hole penetrating in the second direction is provided in an attachment portion of the second actuator device;

the first steering column has a flange protruding to one side in a third direction, the flange being provided with a through hole penetrating in the second direction; and the pin penetrates the through hole of the attachment portion and the through hole of the flange, and the second actuator device is attached to the first steering column.

7. A steering device comprising:

a steering shaft extending in a first direction and having a steering wheel coupled to an end portion on one side in the first direction;

a first steering column arranged outside the steering shaft;

a second steering column arranged outside the first steering column and is movable relative to the first steering column in the first direction; and a third steering column arranged between the steering shaft and the first steering column and extending along the first direction, wherein the third steering column is movable relative to the first steering column in the first direction via an actuator device including a motor and a gear box, and the second steering column includes a frame portion that is arranged on one side in the first direction of the motor and the gear box and is capable of abutting on the motor or the gear box.

* * * * *